US012780390B2

(12) United States Patent
Nakaaki et al.

(10) Patent No.: US 12,780,390 B2
(45) Date of Patent: Nov. 3, 2026

(54) BERTHING ASSISTANCE DEVICE

(71) Applicant: SUZUKI MOTOR CORPORATION, Hamamatsu (JP)

(72) Inventors: Yuki Nakaaki, Hamamatsu (JP); Yuki Tanaka, Hamamatsu (JP); Keiji Imanaga, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 94 days.

(21) Appl. No.: 18/815,491

(22) Filed: Aug. 26, 2024

(65) Prior Publication Data

US 2025/0153836 A1 May 15, 2025

(30) Foreign Application Priority Data

Nov. 9, 2023 (JP) ................................ 2023-191399

(51) Int. Cl.

| | |
|---|---|
| ***B63H 21/21*** | (2006.01) |
| ***B63B 49/00*** | (2006.01) |
| ***B63H 25/04*** | (2006.01) |
| ***B63H 25/42*** | (2006.01) |
| ***G05D 1/242*** | (2024.01) |
| ***G05D 1/243*** | (2024.01) |
| ***G05D 1/43*** | (2024.01) |
| ***G05D 1/661*** | (2024.01) |
| *G05D 109/30* | (2024.01) |

(52) U.S. Cl.

CPC ............. *B63H 21/213* (2013.01); *G05D 1/43* (2024.01); *G05D 1/661* (2024.01); *B63H 2021/216* (2013.01); *G05D 2109/34* (2024.01)

(58) Field of Classification Search

CPC ........... B63H 21/213; B63H 2021/216; B63H 21/21; B63H 25/04; B63H 25/42; G05D 1/43; G05D 1/661; G05D 2109/34; G05D 2107/27; G05D 1/242; G05D 1/243; G05D 1/248; B63B 49/00

USPC ........................................................... 701/21

See application file for complete search history.

(56) References Cited

U.S. PATENT DOCUMENTS

| | | | | |
|---|---|---|---|---|
| 11,034,425 B2 * | 6/2021 | Tamura | B63H 21/213 | |
| 2013/0220191 A1 * | 8/2013 | Rohden | B63H 13/00 | 114/39.3 |
| 2015/0089427 A1 * | 3/2015 | Akuzawa | G05D 1/0206 | 715/771 |

(Continued)

FOREIGN PATENT DOCUMENTS

| | | | |
|---|---|---|---|
| JP | 4853946 B2 | 1/2012 | |
| JP | 2021030834 A * | 3/2021 | B63H 25/02 |

(Continued)

*Primary Examiner* — Tyler D Paige

(74) *Attorney, Agent, or Firm* — Stein IP, LLC

(57) ABSTRACT

A berthing assistance device for assisting berthing of a ship to which a propulsion unit is attached. The berthing assistance device includes a controller configured to control the propulsion unit, based on an operation amount from an operation device, an acquisition unit configured to acquire a ship condition, the ship condition including a current ship position and a current bow direction, a calculation unit configured to calculate a berthing route from the current ship position to a berthing position, and a correction unit configured to correct control of the propulsion unit, based on the ship condition and the berthing route.

10 Claims, 5 Drawing Sheets

(56) References Cited

U.S. PATENT DOCUMENTS

| | | | | |
|---|---|---|---|---|
| 2017/0351259 | A1* | 12/2017 | Tamura | B63B 79/40 |
| 2019/0112021 | A1* | 4/2019 | Watanabe | B63H 5/08 |
| 2019/0317504 | A1* | 10/2019 | Akuzawa | B63B 49/00 |
| 2020/0062366 | A1* | 2/2020 | Murata | B63H 25/38 |
| 2021/0094659 | A1* | 4/2021 | Akuzawa | B63B 79/15 |
| 2021/0221485 | A1* | 7/2021 | Grunewald Mayer | B63B 79/40 |
| 2021/0347449 | A1* | 11/2021 | Dake | B63B 79/40 |
| 2022/0001970 | A1* | 1/2022 | Hara | B63H 25/42 |
| 2023/0192262 | A1* | 6/2023 | Sawada | B63H 25/04 701/21 |
| 2025/0153836 | A1* | 5/2025 | Nakaaki | B63H 25/04 |

FOREIGN PATENT DOCUMENTS

| | | | | |
|---|---|---|---|---|
| KR | 20110059206 | A * | 6/2011 | B63B 35/66 |
| WO | WO-2022118753 | A1 * | 6/2022 | B63H 25/04 |

* cited by examiner

BERTHING ASSISTANCE DEVICE

CROSS-REFERENCE TO RELATED APPLICATIONS

This application is based on and claims priority under 35 USC 119 from Japanese Patent Application No. 2023-191399 filed on Nov. 9, 2023, the entire content of which is incorporated herein by reference.

TECHNICAL FIELD

The present disclosure relates to a berthing assistance device.

BACKGROUND ART

A berthing assistance device has been developed that displays a berthing route on a monitor to assist ship maneuvering (see, for example, JP4853946B). The berthing assistance device described in JP4853946B is provided with a database in which maneuvering records at the time of entering port are registered. The maneuvering records in the database include past weather and sea conditions at the time of entering port, and maneuvering records similar to current weather and sea conditions are searched for in the database. Based on the maneuvering records, a berthing route from a current position of a ship to a berthing position in a port is calculated, and the berthing route, a pier, and the like are displayed on the monitor, whereby the maneuvering accuracy is improved and the safety is enhanced.

However, with the berthing assistance device described in JP4853946B, ship operators have to maneuver a ship along a berthing route depending on the skill, which makes maneuvering particularly difficult for inexperienced ship operators.

SUMMARY OF INVENTION

Aspect of non-limiting embodiments of the present disclosure relates to provide a berthing assistance device capable of reducing maneuvering burden on a ship operator.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a berthing assistance device for assisting berthing of a ship to which a propulsion unit is attached, the berthing assistance device including:

- a controller configured to control the propulsion unit, based on an operation amount from an operation device;
- an acquisition unit configured to acquire a ship condition, the ship condition including a current ship position and a current bow direction;
- a calculation unit configured to calculate a berthing route from the current ship position to a berthing position; and
- a correction unit configured to correct control of the propulsion unit, based on the ship condition and the berthing route.

According to an aspect of the present disclosure, there is provided a berthing assistance device for assisting berthing of a ship to which a propulsion unit is attached, the berthing assistance device including:

- a first controller configured to control the propulsion unit, based on an operation amount from an operation device;
- a second controller configured to:
  - acquire a ship condition, the ship condition including a current ship position and a current bow direction;
  - calculate a berthing route from the current ship position to a berthing position; and
  - correct control of the propulsion unit, based on the ship condition and the berthing route.

BRIEF DESCRIPTION OF DRAWINGS

Exemplary embodiment(s) of the present invention will be described in detail based on the following figures, wherein.

DESCRIPTION OF EMBODIMENTS

A berthing assistance device according to one aspect of the present disclosure assists berthing of a ship to which a propulsion unit is attached. An acquisition unit is configured to acquire a ship condition including a current ship position and a current bow direction, and a calculation unit is configured to calculate a berthing route from the current ship position to a berthing position. A controller is configured to control the propulsion unit based on an operation amount from an operation device. In a case where the ship is likely to deviate from the berthing route due to an operation of the operation device, a correction unit is configured to correct control of the controller based on the ship condition and the berthing route such that the ship follows the berthing route. Therefore, even in a case where the ship is operated by an inexperienced ship operator, the ship can be moved along the berthing route, reducing the burden on the ship operator and enabling stable berthing.

Embodiment

In the berthing assistance in the related art, a traveling direction of a ship is controlled by general steering angle control or individual control of propulsion units using joystick maneuvering. In general steering angle control, a plurality of propulsion units are steered in the same direction, and the plurality of propulsion units are controlled by the same propulsive force. Therefore, when the ship is traveling at a low speed, even if the propulsion units are steered, the direction of the ship is difficult to change and it is also unable to turn in a fixed position. The joystick maneuvering allows the ship to move freely by steering the plurality of propulsion units and controlling the propulsion units individually, but the system becomes complicated and expensive. Therefore, in the present embodiment, a direction of a ship is adjusted by the steering angle control at a normal ship speed, and the direction of the ship is adjusted by switching to individual thrust control of the plurality of propulsion units at a low speed.

Figure 1:
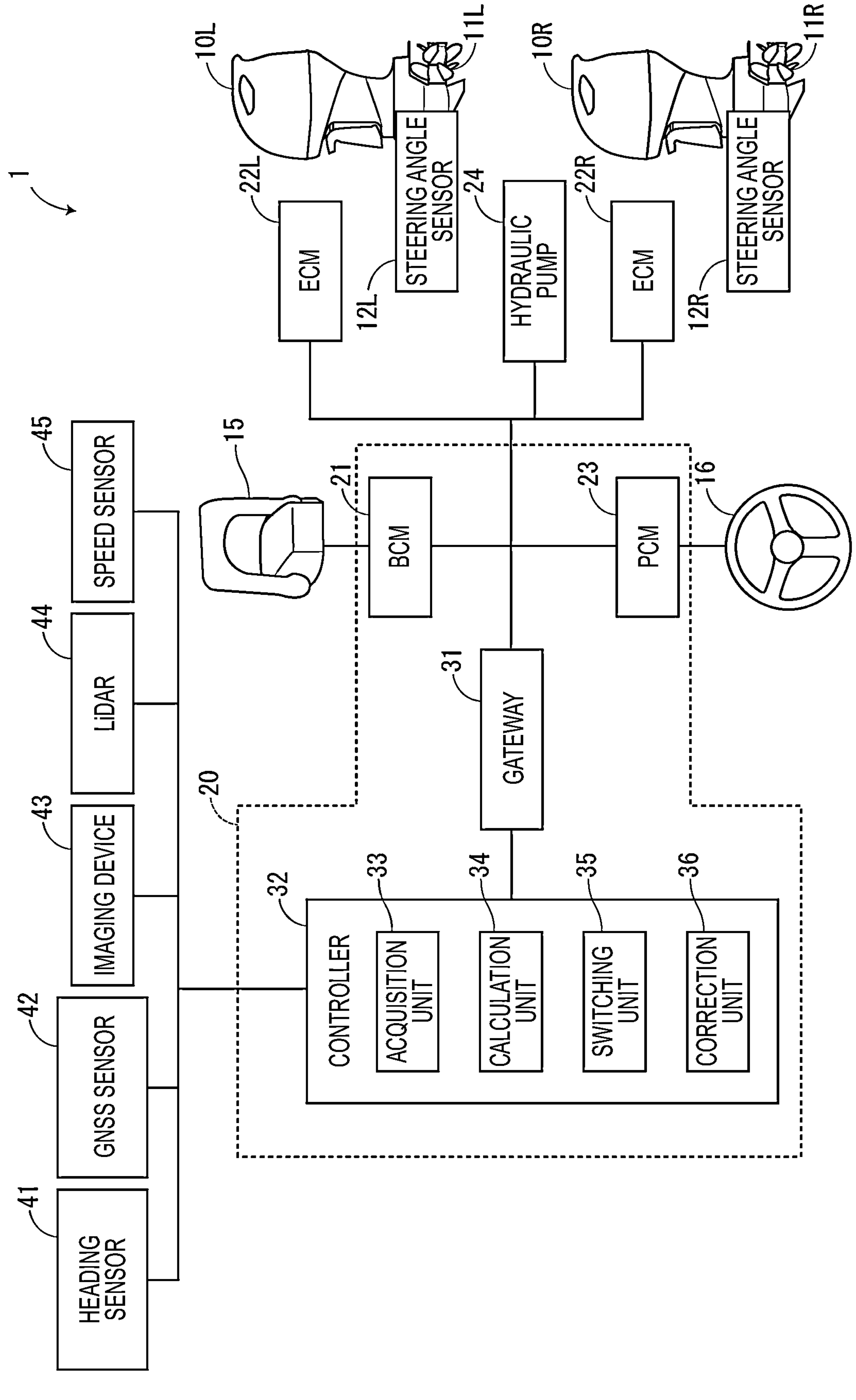
FIG. 1 is a configuration diagram of a maneuvering system of the present embodiment.
Figure 2:
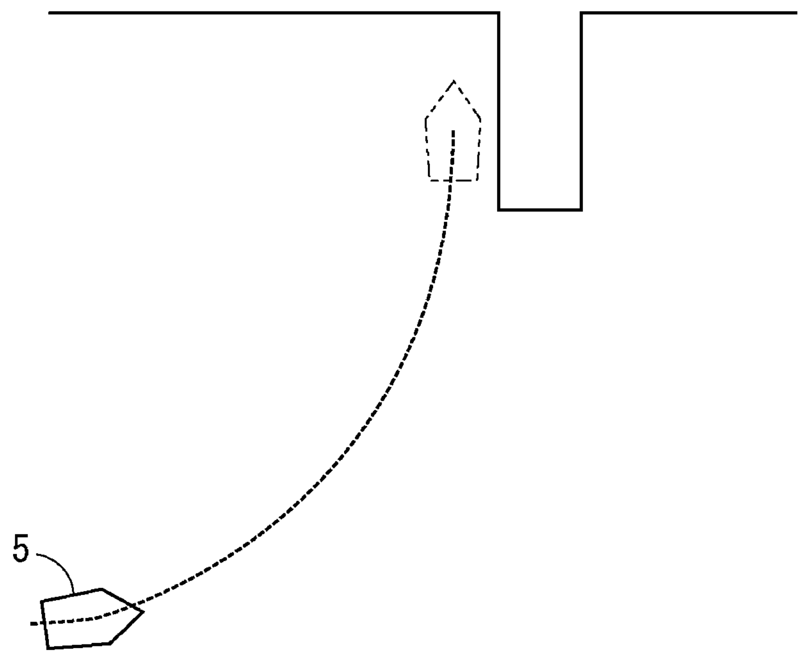
FIG. 2 is a schematic diagram of a berthing route of the present embodiment.

Hereinafter, a maneuvering system of the present embodiment will be described with reference to the accompanying drawings. FIG. 1 is a configuration diagram of the maneuvering system of the present embodiment. FIG. 2 is a schematic diagram of a berthing route of the present embodiment.

As shown in FIG. 1, in a maneuvering system 1, a ship is maneuvered by thrust control and steering angle control for left and right propulsion units 10L and 10R. The propulsion unit 10L is attached to a left side of a rear portion of a hull, and the propulsion unit 10R is attached to a right side of the rear portion of the hull. The propulsion units 10L and 10R are each provided with an engine, and propellers 11L and 11R are rotated by the engines to apply a propulsive force to the hull. The propulsion units 10L and 10R are provided with steering angle sensors 12L and 12R, respectively. In a case where the propulsion units 10L and 10R are steered to the left or right, the steering angle sensors 12L and 12R detect steering angles of the propulsion units 10L and 10R.

A control box 15 is installed in the hull as an operation device for thrust control. The control box 15 is configured to operate both a throttle and a shift using a lever operation. In a case where the lever of the control box 15 is moved from a neutral position to a forward position, the propulsion units 10L and 10R are put into forward gear, and in a case where the lever is moved forward beyond the forward position, throttle opening is adjusted. In a case where the lever of the control box 15 is moved from the neutral position to a reverse position, the propulsion units 10L and 10R are put into reverse gear, and in a case where the lever is moved rearward beyond the reverse position, the throttle opening is adjusted.

Engine control modules (ECMs) 22L and 22R are connected to the control box 15, via a ship control module (BCM) 21 serving as a controller. The ECM 22L is configured to control the engine of the propulsion unit 10L, and the ECM 22R is configured to control the engine of the propulsion unit 10R. In the BCM 21, a throttle command value and a shift command value are calculated based on a lever angle of the control box 15. In a case where the BCM 21 outputs a throttle command value and a shift command value to the ECMs 22L and 22R, the ECMs 22L and 22R adjust the throttle opening of the propulsion units 10L and 10R and rotational directions of the propellers 11L and 11R.

A handle 16 is installed in the hull as an operation device for the steering angle control. A hydraulic pump 24 is connected to the handle 16, via a pump control module (PCM) 23 serving as a controller. Hydraulic cylinders (not shown) for the propulsion units 10L and 10R are connected to the hydraulic pump 24. In a case where hydraulic oil is supplied from the hydraulic pump 24 to the hydraulic cylinders, the propulsion units 10L and 10R are steered. In the PCM 23, a steering command value is calculated based on a steering angle of the handle 16. In a case where a steering command value is output from the PCM 23 to the hydraulic pump 24, the hydraulic oil is supplied to the hydraulic cylinders of the propulsion units 10L and 10R by the hydraulic pump 24, and the steering angles of the propulsion units 10L and 10R are adjusted.

The maneuvering system 1 includes a berthing assistance device 20 configured to assist a ship operator in a berthing operation such that a ship follows a berthing route from a current ship position to a berthing position. In addition to the BCM 21 and the PCM 23, a controller 32 connected to the BCM 21 and the PCM 23 via a gateway 31 is provided in the berthing assistance device 20. The controller 32 is also configured to calculate the throttle command value, the shift command value, and the steering command value. In a normal maneuvering mode, the gateway 31 gives priority to control processing of the BCM 21 and the PCM 23 over control processing of the controller 32. In a berthing assistance mode, the gateway 31 gives priority to the control processing of the controller 32 over the control processing of the BCM 21 and the PCM 23.

Various sensors such as a heading sensor 41, a global navigation satellite system (GNSS) sensor 42, an imaging device 43, a LiDAR 44, and a speed sensor 45 for detecting a current ship condition are connected to the controller 32. The heading sensor 41 is configured to detect a current bow direction, the GNSS sensor 42 is configured to detect a current ship position, the imaging device 43 is configured to detect a current surrounding image of a ship 5, the LiDAR 44*a* is configured to detect a distance to a surrounding object, and the speed sensor 45 is configured to detect a current ship speed. That is, the current ship condition includes at least the bow direction, the ship position, the surrounding image, the distance to a surrounding object, and the ship speed.

The controller 32 includes an acquisition unit 33 configured to acquire the current ship conditions, a calculation unit 34 configured to calculate a berthing route, a switching unit 35 configured to switch an operation mode, and a correction unit 36 configured to correct the control of the propulsion units 10L and 10R. The acquisition unit 33 is configured to acquire, as the current ship conditions, the current bow direction, ship position, surrounding image, distance to a surrounding object, and ship speed from the heading sensor 41, GNSS sensor 42, imaging device 43, LiDAR 44, and speed sensor 45, respectively. Installation locations of the sensors are not limited to the hull, and the sensors may be installed in a mobile device of the ship operator, the propulsion units 10L and 10R, or the like as long as the ship condition can be detected.

The calculation unit 34 is configured to calculate a berthing route from a current ship position to a berthing position. In this case, the berthing position and a berthing direction are stored in the controller 32. The berthing route from the current ship position to the berthing position is automatically calculated by the Bézier curve (see FIG. 2), based on the current ship position, the current bow direction, the berthing position, and the berthing direction. The berthing position may be set by the ship operator specifying a berthing position on a map. In addition, the berthing route may be calculated in consideration of nautical charts of shallow waters, weather conditions, and sea conditions. Further, a plurality of berthing routes may be displayed on a map, and the ship operator may select a desired berthing route.

The switching unit 35 is configured to switch from the maneuvering mode to the berthing assistance mode, in a case where all start conditions of the berthing assistance mode are satisfied. The switching unit 35 is configured to switch from the berthing assistance mode to the maneuvering mode, in a case where any one of end conditions of the berthing assistance mode is satisfied. The start conditions of the berthing assistance mode are set to be that the ship 5 is near the berthing position, that the propulsion units 10L and 10R are put into the forward gear, that the ship speed is equal to or less than a predetermined ship approach speed, or the like. The end conditions of the berthing assistance mode are set to be that the ship 5 arrives at the berthing position, that the handle 16 is steered by a predetermined angle or more, that the ship 5 is deviated from the berthing route, that the propulsion units 10L and 10R are put into neutral gears or reverse gears, or the like.

Whether the ship 5 is near the berthing position is determined by detecting a distance to the berthing position using the imaging device 43 and the LiDAR 44. For example, a captured image detected by the imaging device 43 and point cloud data detected by the LiDAR 44 are integrated, and the LiDAR 44 is configured to detect a distance to a target object near the berthing position recognized by the imaging device 43. The berthing assistance mode will not be started until the distance from the ship 5 to the berthing position is equal to or less than a predetermined distance (for example, 50 m). In addition, a feature point of the target object, such as a mark on a pier or the like is stored in advance in the controller 32, and the target object is recognized by matching a feature point extracted from the captured image with the feature point stored in advance.

Whether the propulsion units 10L and 10R are put into the forward gear is determined by detecting the lever angle (an operation angle of the lever) of the control box 15. An angle sensor (not shown) is provided in the control box 15, and the lever angle is input from the angle sensor to the controller 32. In a case where the lever angle is an operation angle exceeding the forward position, it is determined that the propulsion units 10L and 10R are put into the forward gear. In a case where the lever angle is an operation angle exceeding the reverse position, it is determined that the propulsion units 10L and 10R are put into the reverse gear. In a case where the lever angle is an operation angle between the forward position and the reverse position, it is determined that the propulsion units 10L and 10R are put into the neutral gear. In a case where the propulsion units 10L and 10R are not put into the forward gear, the berthing assistance mode will not be started.

Whether the ship speed is equal to or less than the predetermined ship approach speed is determined detecting the ship speed using the speed sensor 45. In a case where the ship speed is greater than the predetermined ship approach speed (for example, 15 km/h), the ship 5 is decelerated by the controller 32 before switching to the berthing assistance mode. As a result, the ship 5 is switched from the normal maneuvering mode to the berthing assistance mode after decelerating to the predetermined ship approach speed or below and becoming stable. In addition, the ship speed may be not the current ship speed, but may be a ship speed at the time of berthing which is obtained from the current ship speed, a fixed deceleration, and a linear distance to the berthing position, and the ship speed at the time of berthing and the predetermined ship approach speed (for example, 5 km/h) may be compared.

Whether the ship 5 arrives at the berthing position is determined by detecting the current ship position using the GNSS sensor 42. In a case where the current ship position substantially coincides with the berthing position, it is assumed that the berthing operation of the ship 5 is successful, and the berthing assistance mode is ended. Whether the handle 16 is steered by a predetermined angle or more is determined by detecting the steering angle of the handle 16. An angle sensor (not shown) is provided in the handle 16, and the steering angle is input from the angle sensor to the controller 32. In a case where the steering angle of the handle 16 is equal to or greater than a predetermined angle, it is assumed that the berthing operation of the ship 5 is stopped by the ship operator, and the berthing assistance mode is ended.

Whether the ship 5 is detached from the berthing route is determined by detecting the current ship position using the GNSS sensor 42. In a case where the current ship position deviates significantly from the berthing route (for example, by several meters), it is assumed that the berthing operation of the ship 5 is stopped by the ship operator, and the berthing assistance mode is ended. Whether the propulsion units 10L and 10R are put into the neutral gear or the reverse gear is determined by detecting the operation angle of the lever of the control box 15 as described above. In a case where the propulsion units 10L and 10R are put into the neutral gear or the reverse gear, it is also assumed that the berthing operation of the ship 5 is stopped by the ship operator, and the berthing assistance mode is ended.

The correction unit 36 is configured to correct the control of the propulsion units 10L and 10R, based on the ship condition and the berthing route in the berthing assistance mode. A target turning angle is calculated based on a difference between the current ship position and a target position on the berthing route and a difference between the current bow direction and a target direction of the berthing route. In a case where the target turning angle is equal to or greater than a predetermined angle (for example, 15 degrees), the control of the propulsion units 10L and 10R is corrected such that the ship 5 follows the berthing route. At this time, in a case where the ship speed is equal to or less than a predetermined ship speed (for example, 8 km/m), the direction of the ship 5 is unlikely to change by steering. Therefore, in a case where the ship speed is greater than a predetermined ship speed, the steering angle control of the propulsion units 10L and 10R is performed. In a case where the ship speed is equal to or less than the predetermined ship speed, the individual thrust control of the propulsion units 10L and 10R is performed.

In the steering angle control, the steering angle of the handle 16 is input to the controller 32 via the gateway 31, and the correction unit 36 calculates the steering command value such that the target turning angle is smaller than the predetermined angle. In the individual thrust control, the lever angle of the control box 15 and the steering angle of the handle 16 are input to the controller 32 via the gateway 31, and the correction unit 36 calculates the throttle command value and the shift command value such that the target turning angle is smaller than the predetermined angle. The correction unit 36 may be configured to correct the steering command value calculated by the PCM 23, the throttle command value calculated by the BCM 21, and the like. The steering angle control and the individual thrust control by the correction unit 36 will be described in detail later.

The processing of each unit of the berthing assistance device 20 may be implemented by software using a processor, or may be implemented by a logic circuit (hardware) formed in an integrated circuit or the like. When a processor is used, the processor reads and executes programs stored in a memory, thereby performing various types of processing. As the processor, for example, a central processing unit (CPU) is used. The memory is implemented by one or more storage media such as a read only memory (ROM) and a random access memory (RAM) according to the use.

Figure 3:
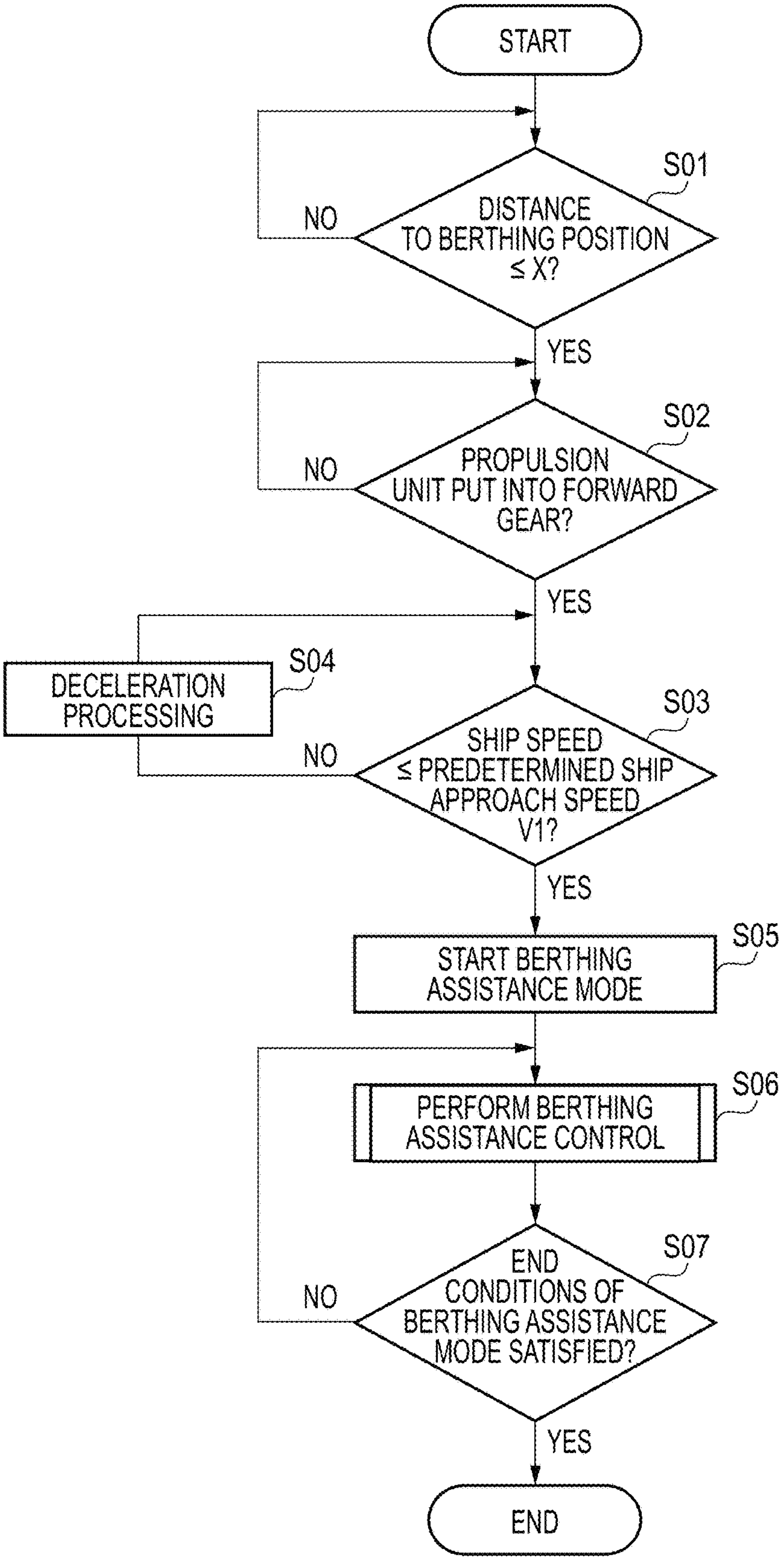
FIG. 3 is a flowchart of berthing assistance control of the present embodiment.
Figure 4:
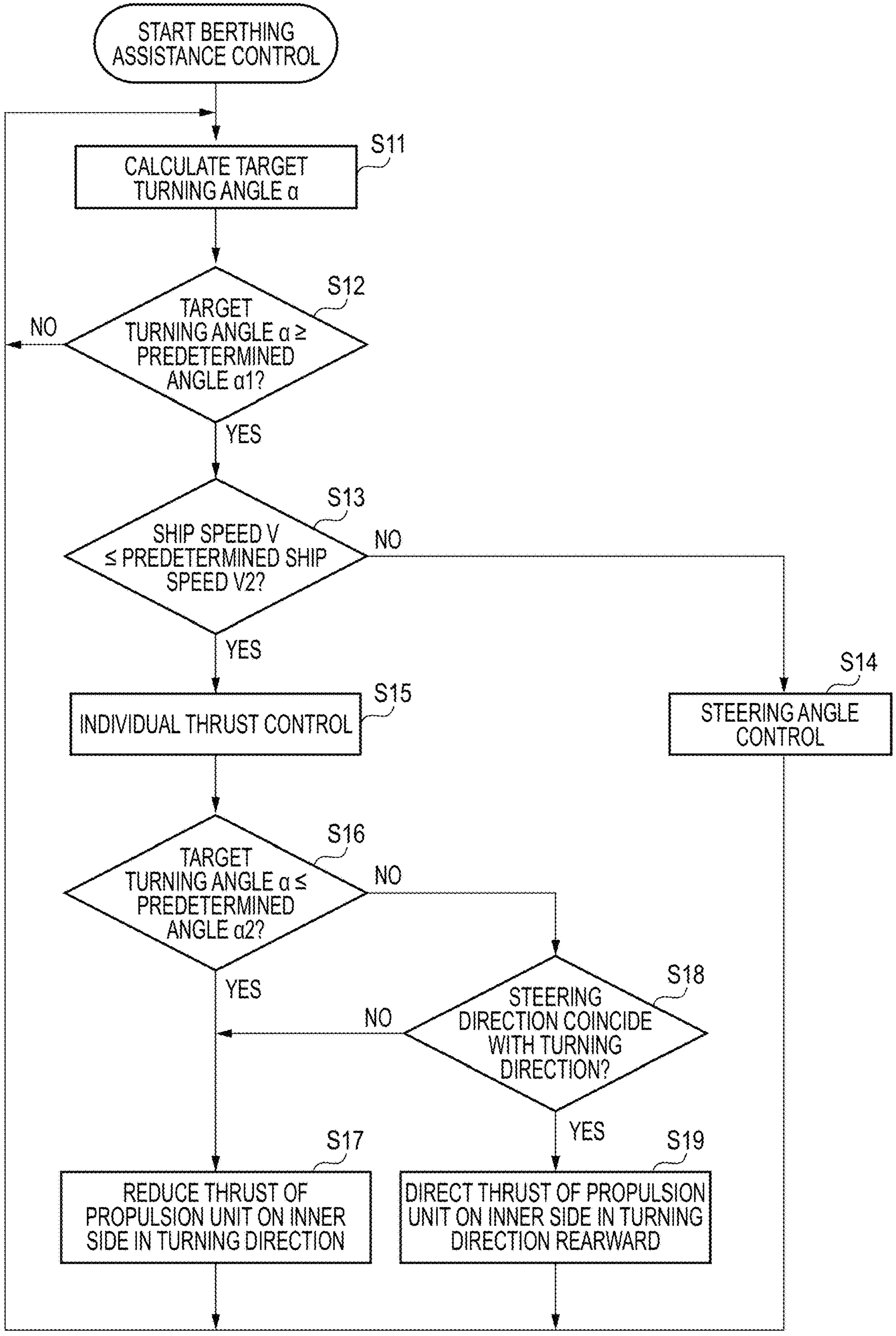
FIG. 4 is a flowchart of correction processing of the present embodiment.
Figure 5A:
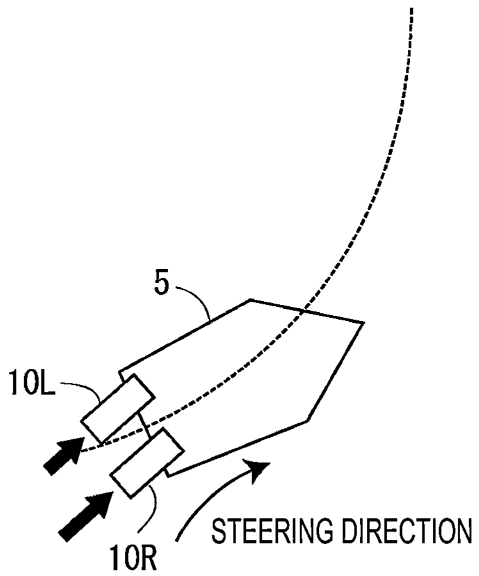
FIG. 5A is a diagram showing a target turning direction and a steering angle direction of the propulsion unit according to the present embodiment.
Figure 5B:
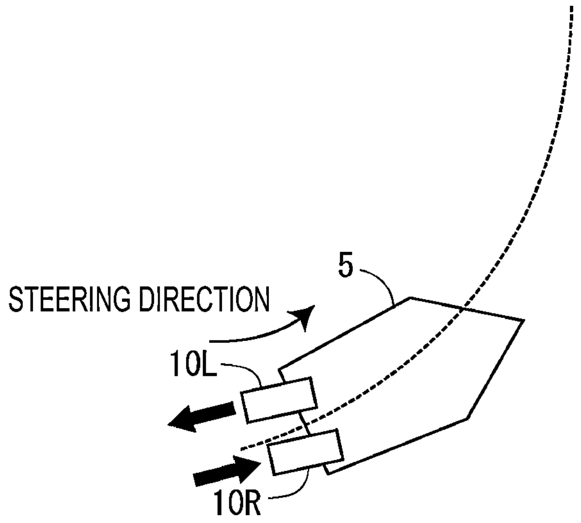
FIG. 5B is a diagram showing a target turning direction and a steering angle direction of the propulsion unit according to the present embodiment.

Berthing assistance control will be described with reference to FIG. 3 to FIG. 5B. FIG. 3 is a flowchart of a berthing control operation according to the present embodiment. FIG. 4 is a flowchart of correction processing according to the present embodiment. FIG. 5A is a diagram showing a target turning direction and a steering angle direction of the propulsion unit according to the present embodiment. FIG. 5B is a diagram showing a target turning direction and a steering angle direction of the propulsion unit according to the present embodiment. In the following description, the reference numerals in FIG. 1 will be appropriately used. When left and right propulsion units are not particularly distinguished from each other, the reference signs L and R will be omitted in the description.

As shown in FIG. 3, in a case where the current ship position approaches the berthing position, switching determination of the operation mode is performed by the switching unit 35. The imaging device 43 and the LiDAR 44 detect the distance from the ship 5 to the berthing position (a target object near the berthing position), and the switching unit 35 determines whether the distance from the ship 5 to the berthing position is equal to or less than a predetermined distance X (step S01). in a case where the distance from the ship 5 to the berthing position is equal to or less than the predetermined distance X (Yes in step S01), the switching unit 35 determines whether the propulsion units 10L and 10R are put into the forward gear based on the lever angle of the control box 15 (step S02).

In a case where the propulsion units 10L and 10R are put into the forward gear (Yes in step S02), the switching unit 35 determines whether a ship speed Vis equal to or less than a predetermined ship approach speed V1, based on a detection result of the speed sensor 45 (step S03). In a case where the ship speed V is greater than the predetermined ship approach speed V1 (No in step S03), deceleration processing is performed until the ship speed Vis equal to or less than the predetermined ship approach speed V1 (step S04). In a case where the ship speed V is equal to or less than the predetermined ship approach speed V1 (Yes in step S03), the switching unit 35 determines that all of the start conditions of the berthing assistance mode are satisfied, and switches the operation mode from the maneuvering mode to the berthing assistance mode (step S05).

In the berthing assistance mode, the berthing assistance control, which will be described later, is performed, and the ship operator is assisted in the berthing operation such that a ship follows a berthing route (step S06). Then, the berthing assistance control is performed until any one of the operations of the arrival of the ship 5 to the berthing position, the steering by a predetermined angle or more, the detachment of the ship 5 from the berthing route, and the switching to the neutral gear or the reverse gear is performed (No in Step S07). In a case where any one of the operations, such as the arrival at the berthing position, is performed, the switching unit 35 determines that any one of the end conditions of the berthing assistance mode is satisfied, and switches the operation mode from the berthing assistance mode to the maneuvering mode (Yes in step S07).

As shown in FIG. 4, in a case where the berthing assistance control is started, the correction unit 36 calculates a target turning angle α, based on a difference between a current ship position and a target position on the berthing route and a difference between a current bow direction and a target direction of the berthing route (Step S11). In addition, the calculation unit 34 may be configured to calculate the berthing route before switching to the berthing assistance mode, or the calculation unit 34 may be configured to calculate the berthing route after switching to the berthing assistance mode. In a case where it is determined that the target turning angle α is equal to or greater than a predetermined angle α1 (Yes in step S12), it is assumed that the ship 5 starts to deviate from the berthing route, and the correction unit 36 determines whether the ship speed is equal to or less than a predetermined ship speed V2 (step S13).

In a case where the ship speed is greater than the predetermined ship speed V2 (No in step S13), the ship speed is such that the direction of the ship 5 can be easily adjusted by the steering angle control. Therefore, the correction unit 36 performs the steering angle control on the propulsion units 10L and 10R (step S14). In the steering angle control, the steering command value is obtained based on the target turning angle α, the steering angle of the handle 16, and the lever angle of the control box 15, and the propulsion units 10L and 10R are steered according to the steering command value such that the target turning angle α becomes smaller. As described above, at a ship speed greater than the predetermined ship speed V2, the maneuvering is assisted by the steering angle control of the propulsion units 10L and 10R such that a ship follows the berthing route.

In a case where the ship speed is equal to or less than the predetermined ship speed V2 (Yes in step S13), the ship speed is such that the direction of the ship 5 is difficult to adjust by the steering angle control. Therefore, the correction unit 36 performs the individual thrust control on the propulsion units 10L and 10R (step S15). In the individual thrust control, the throttle command value and the shift command value are obtained based on the target turning angle α, the steering angle of the handle 16, and the lever angle of the control box 15. The correction unit 36 determines whether the target turning angle α is equal to or less than a predetermined angle α2 (step S16). The predetermined angle α2 is an angle larger than the predetermined angle α1, and is an angle for determining whether the ship 5 needs to make a sharp turn.

In a case where the target turning angle α is equal to or smaller than the predetermined angle α2 (for example, 30 degrees) (Yes in step S16), the ship 5 is not required to make a sharp turn. Therefore, the thrust of the propulsion unit 10 (for example, the propulsion unit 10L) on an inner side in a turning direction is reduced (step S17). In a case where the thrust of the propulsion unit 10 on the side to be steered decreases, the ship 5 is turned due to a thrust difference between the left and right propulsion units 10L and 10R such that the target turning angle α becomes smaller. In this way, in a case where the ship speed is equal to or less than the predetermined ship speed V2 and the ship 5 is not required to make a sharp turn, the maneuvering is assisted due to the thrust reduction of the propulsion unit 10 on the inner side in the turning direction such that a ship follows the berthing route.

In a case where the target turning angle α is larger than the predetermined angle α2 (No in step S16), the correction unit 36 determines whether a steering direction of the propulsion unit 10 coincides with the turning direction (step S18). As shown in FIG. 5A, in a case where the steering direction of the propulsion unit 10 does not coincide with a target turning direction (No in step S18), the thrust of the propulsion unit 10 (for example, the propulsion unit 10L) on an inner side in the turning direction is reduced (step S17). As described above, even in a case where the ship speed is equal to or less than the predetermined ship speed V2 and the steering direction of the propulsion unit 10 does not coincide with the target turning direction, the ship 5 is turned without breaking the balance due to the thrust reduction of the propulsion unit 10 on the inner side in the turning direction.

On the other hand, as shown in FIG. 5B, in a case where the steering direction of the propulsion unit 10 coincides with the target turning direction (Yes in step S18), the thrust of the propulsion unit 10 (for example, the propulsion unit 10L) on the inner side in the turning direction is directed rearward (step S19). In a case where the thrust of the propulsion unit 10 on the side to be steered is reversed, the ship 5 makes a sharp turn with a small turn around a stern side such that the target turning angle $\alpha$ becomes smaller. In this way, in a case where the ship speed is equal to or less than the predetermined ship speed V2 and a sharp turn is required, the ship 5 makes a sharp turn by reversing the thrust of the propulsion unit 10 on the inner side in the turning direction. Then, steps S11 to S19 are repeated until the berthing assistance mode ends.

In addition, thresholds of the predetermined distance X, the predetermined ship approach speed V1, the predetermined ship speed V2, the predetermined angle $\alpha 1$, the predetermined angle $\alpha 2$, and the like of the flowcharts described above may be obtained in advance experimentally, empirically, or theoretically. However, the predetermined ship speed V2 is set to a speed less than the predetermined ship approach speed V1, and the predetermined angle $\alpha 2$ is set to an angle larger than the predetermined angle $\alpha 1$. Each of the flowcharts described above is an example, and the order of some steps may be changed. For example, the order of the processing of steps S01 to S03, which are the start conditions of the berthing assistance mode, may be changed.

As described above, according to the berthing assistance device 20 of the present embodiment, in a case where the ship 5 is likely to deviate from a berthing route due to an operation of the handle 16 or the control box 15, control of the propulsion unit 10 is corrected such that a ship position and a bow direction follow the berthing route. Therefore, even in a case where the ship 5 is operated by an inexperienced ship operator, the ship 5 can be moved along the berthing route, reducing the burden on the ship operator and enabling stable berthing.

In addition, the berthing of the present embodiment includes not only berthing a ship at a pier, but also berthing a ship at a shore.

In the present embodiment, although the ship is provided with a pair of left and right propulsion units, the ship may be provided with three or more propulsion units.

In the present embodiment, although the operation device includes a control box and a handle, the operation device is not particularly limited as long as the operation device is capable of controlling the propulsion units.

In the present embodiment, although the BCM, the PCM, and the controller are separately formed, the BCM, the PCM, and the controller may be integrally formed.

In the present embodiment, the propulsion units may be any one of an outboard motor, an inboard/outboard motor, and an inboard motor.

In the present embodiment, the ship may be configured to be capable of moving horizontally by individual control of the plurality of propulsion units.

In the present embodiment, by installing a program in the maneuvering system, a berthing assistance function may be added. This program is stored in a storage medium. The storage medium is not particularly limited, and may be a non-transitory storage medium such as an optical disk, a magneto-optical disk, or a flash memory.

As described above, a first aspect is a berthing assistance device for assisting berthing of a ship to which a propulsion unit (10L and 10R) is attached, and the berthing assistance device includes a controller (the BCM 21 and the PCM 23) configured to control the propulsion unit based on an operation amount from an operation device (the control box 15 and the handle 16), an acquisition unit (33) configured to acquire a ship condition, the ship condition including a current ship position and a current bow direction, a calculation unit (34) configured to calculate a berthing route from the current ship position to a berthing position, and a correction unit (36) configured to correct the control of the propulsion unit based on the ship condition and the berthing route. According to this configuration, when the ship is likely to deviate from the berthing route due to an operation of the operation device, the control of the propulsion unit is corrected such that the ship position and the bow direction follow the berthing route. Therefore, even in a case where the ship is operated by an inexperienced ship operator, the ship can be moved along the berthing route, reducing the burden on the ship operator and enabling stable berthing.

According to a second aspect, in the first aspect, a plurality of propulsion units are attached to the ship, the ship condition includes a current ship speed, the correction unit is configured to obtain a target turning angle based on a difference between the current bow direction and a target direction of the berthing route, and in a case where the current ship speed is equal to or less than a predetermined ship speed and the target turning angle is equal to or less than a predetermined angle, decrease thrust of a propulsion unit among the plurality of propulsion units on an inner side in a turning direction. According to this configuration, when the ship speed is equal to or less than a predetermined ship speed at which a direction of the ship is difficult to adjust by steering angle control and a sharp turn is not required, maneuvering is assisted due to the thrust reduction of the propulsion unit on the inner side in the turning direction such that the ship follows the berthing route.

According to a third aspect, in the first aspect or the second aspect, a plurality of propulsion units are attached to the ship, the ship condition includes a current ship speed, the correction unit is configured to obtain a target turning angle based on a difference between the current bow direction and a target direction of the berthing route, and in a case where the current ship speed is equal to or less than a predetermined ship speed, the target turning angle is larger than a predetermined angle, and a steering direction does not coincide with a target turning direction, decrease thrust of a propulsion unit among the plurality of propulsion units on an inner side in the turning direction. According to this configuration, even when the ship speed is equal to or less than the predetermined ship speed at which a direction of the ship is difficult to adjust by steering angle control and the steering direction of the propulsion unit does not coincide with the target turning direction, the ship can be turned without breaking the balance due to the thrust reduction of the propulsion unit on the inner side in the turning direction.

According to a fourth aspect, in any one of the first aspect to the third aspect, the ship condition includes a current ship speed, the correction unit is configured to obtain a target turning angle based on a difference between the current bow direction and a target direction of the berthing route, and in a case where the current ship speed is greater than a predetermined ship speed, turn the propulsion unit such that the target turning angle becomes smaller. According to this configuration, it is effective to adjust the direction of the ship by the steering angle control of the propulsion unit at a ship speed greater than the predetermined ship speed. Therefore, it is possible to assist the maneuvering by the steering angle control such that the ship follows the berthing route.

According to a fifth aspect, in any one aspect of the first aspect to the fourth aspect, a plurality of propulsion units are attached to the ship, the ship condition includes a current ship speed, the correction unit is configured to obtain a target turning angle based on a difference between the current bow direction and a target direction of the berthing route, and when the current ship speed is equal to or less than a predetermined ship speed, the target turning angle is larger than a predetermined angle, and a steering direction coincides with a target turning direction, decrease thrust of a propulsion unit, among the plurality of propulsion units, on an inner side in the turning direction rearward. According to this configuration, when the ship speed is equal to or less than a predetermined ship speed at which the direction of the ship is difficult to adjust by the steering angle control and a sharper turn than a predetermined angle is required, the ship can make a sharp turn by reversing the thrust of the propulsion unit on the inner side in the turning direction.

According to a sixth aspect, in any one of the first aspect to the fifth aspect, the ship condition includes a current ship speed and a required distance to a berthing position, correction processing is performed by the correction unit after switching from a maneuvering mode to a berthing assistance mode, and in a case where the distance to the berthing position is equal to or less than a predetermined distance, the ship is put into forward gear, and the ship speed is greater than a predetermined ship approach speed, the ship is decelerated before switching to the berthing assistance mode. According to this configuration, the ship can be switched from the normal maneuvering mode to the berthing assistance mode after decelerating to the predetermined ship approach speed or below and becoming stable.

According to a seventh aspect, in any one of the first aspect to the sixth aspect, correction processing is performed by the correction unit after switching from a maneuvering mode to a berthing assistance mode, and in a case where it is detected that the ship arrives at the berthing position, that steering is performed by a predetermined angle or more, that the ship is deviated from the berthing route, or that the propulsion unit is put into neutral gear or reverse gear, the berthing assistance mode is ended. According to this configuration, the berthing assistance mode is not only ended when the ship arrives at the berthing position, but also ended in accordance with the intention of a ship operator when the ship operator wants to cancel the berthing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A berthing assistance device for assisting berthing of a ship to which a propulsion unit is attached, the berthing assistance device comprising:
- a controller configured to control the propulsion unit, based on an operation amount from an operation device;
- an acquisition unit configured to acquire a ship condition, the ship condition including a current ship position and a current bow direction;
- a calculation unit configured to calculate a berthing route from the current ship position to a berthing position;
- a correction unit configured to correct control of the propulsion unit, based on the ship condition and the berthing route; and
- a switching unit configured to perform switching between a maneuvering mode and a berthing assistance mode,
- wherein a start condition of the berthing assistance mode includes a plurality of conditions, and the switching unit is configured to perform the switching from the maneuvering mode to the berthing assistance mode in a case where all of the conditions are satisfied.

2. The berthing assistance device according to claim 1, wherein a plurality of propulsion units are attached to the ship,
the ship condition includes a current ship speed,
the correction unit is configured to:
- obtain a target turning angle, based on a difference between the current bow direction and a target direction of the berthing route; and
- in a case where the current ship speed is equal to or less than a predetermined ship speed and the target turning angle is equal to or less than a predetermined angle, decrease thrust of a propulsion unit among the plurality of propulsion units on an inner side in a turning direction.

3. The berthing assistance device according to claim 1, wherein a plurality of propulsion units are attached to the ship,
the ship condition includes a current ship speed,
the correction unit is configured to:
- obtain a target turning angle, based on a difference between the current bow direction and a target direction of the berthing route; and
- in a case where the current ship speed is equal to or less than a predetermined ship speed, the target turning angle is larger than a predetermined angle, and a steering direction does not coincide with a target turning direction, decrease thrust of a propulsion unit among the plurality of propulsion units on an inner side in the turning direction.

4. The berthing assistance device according to claim 1, wherein the ship condition includes a current ship speed,
the correction unit is configured to:
- obtain a target turning angle, based on a difference between the current bow direction and a target direction of the berthing route, and
- in a case where the current ship speed is greater than a predetermined ship speed, turn the propulsion unit such that the target turning angle becomes smaller.

5. The berthing assistance device according to claim 1, wherein a plurality of propulsion units are attached to the ship,
the ship condition includes a current ship speed,
the correction unit is configured to:
- obtain a target turning angle, based on a difference between the current bow direction and a target direction of the berthing route, and
- in a case where the current ship speed is equal to or less than a predetermined ship speed, the target turning angle is larger than a predetermined angle, and a steering direction coincides with a target turning direction, decrease thrust of a propulsion unit, among the plurality of propulsion units, on an inner side in the turning direction rearward.

6. The berthing assistance device according to claim 1, wherein the ship condition includes a current ship speed and a required distance to a berthing position, correction processing is performed by the correction unit after switching from a maneuvering mode to a berthing assistance mode, and in a case where the distance to the berthing position is equal to or less than a predetermined distance, the ship is put into forward gear, and the ship speed is greater than a predetermined ship approach speed, the ship is decelerated before switching to the berthing assistance mode.

7. The berthing assistance device according to claim 1, wherein correction processing is performed by the correction unit after switching from a maneuvering mode to a berthing assistance mode, and in a case where it is detected that the ship arrives at the berthing position, that steering is performed by a predetermined angle or more, that the ship is deviated from the berthing route, or that the propulsion unit is put into neutral gear or reverse gear, the berthing assistance mode is ended.

8. The berthing assistance device according to claim 1, wherein the plurality of conditions include:

a condition that the ship is near the berthing position, a condition that the propulsion unit is in a forward gear, and a condition that a ship speed is equal to or less than a predetermined ship approach speed.

9. A berthing assistance device for assisting berthing of a ship to which a propulsion unit is attached, the berthing assistance device comprising:

a first controller configured to control the propulsion unit, based on an operation amount from an operation device;

a second controller configured to:

acquire a ship condition, the ship condition including a current ship position and a current bow direction;

calculate a berthing route from the current ship position to a berthing position;

correct control of the propulsion unit, based on the ship condition and the berthing route; and perform switching between a maneuvering mode and a berthing assistance mode, wherein the second controller is configured to perform the switching from the maneuvering mode to the berthing assistance mode, in a case where all of a plurality of conditions included in a start condition of the berthing assistance mode are satisfied.

10. The berthing assistance device according to claim 9, wherein the plurality of conditions include:

a condition that the ship is near the berthing position, a condition that the propulsion unit is in a forward gear, and a condition that a ship speed is equal to or less than a predetermined ship approach speed.

* * * * *